United States Patent
Fujimori et al.

(10) Patent No.: US 8,072,633 B2
(45) Date of Patent: *__Dec. 6, 2011__

(54) PRINT SHOP MANAGEMENT METHOD AND APPARATUS FOR PRINTING DOCUMENTS USING A PLURALITY OF DEVICES

(75) Inventors: Toshiro Fujimori, Laguna Beach, CA (US); Geoff W. Harmon, Mission Viejo, CA (US); Rakesh Pandit, Irvine, CA (US); Shigenori Matsubara, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1017 days.

This patent is subject to a terminal disclaimer.

(21) Appl. No.: 11/616,833

(22) Filed: Dec. 27, 2006

(65) Prior Publication Data
US 2007/0229883 A1    Oct. 4, 2007

Related U.S. Application Data

(63) Continuation-in-part of application No. 11/395,585, filed on Mar. 31, 2006.

(51) Int. Cl.
*G06F 3/12* (2006.01)
*G06K 1/00* (2006.01)
(52) U.S. Cl. .......................... 358/1.15; 358/1.9
(58) Field of Classification Search .................. 358/1.1, 358/1.9, 1.13, 1.14, 1.15, 302, 448, 500, 358/518
See application file for complete search history.

(56) References Cited

U.S. PATENT DOCUMENTS

| 6,985,245 | B1 * | 1/2006 | Takahashi | 358/1.15 |
| 7,061,636 | B2 | 6/2006 | Ryan et al. | |
| 2002/0042798 | A1 | 4/2002 | Takei et al. | |
| 2002/0114004 | A1 * | 8/2002 | Ferlitsch | 358/1.15 |
| 2004/0184106 | A1 * | 9/2004 | Ferlitsch | 358/2.1 |
| 2007/0201078 | A1 * | 8/2007 | Morales et al. | 358/1.15 |

FOREIGN PATENT DOCUMENTS

JP   2004-341603   12/2004

OTHER PUBLICATIONS

Japanese Office Action, dated Aug. 30, 2011, in related Japanese patent application No. JP 2007-090253.

* cited by examiner

*Primary Examiner* — Gabriel Garcia
(74) *Attorney, Agent, or Firm* — Chen Yoshimura LLP

(57) ABSTRACT

A method is described for managing a print shop system in which a plurality of printers are connected to and managed by a server. The server receives a print job including a job ticket and source document to be printed, and generates two or more sub-jobs each including a sub-job ticket and a sub-document by analyzing the job ticket and the content of the source document. The two or more sub-jobs are submitted to a plurality of printers and/or finishing devices in accordance with the sub-job tickets. One particular example is color split printing where black and white pages and color pages of a source document are split into two sub-jobs to be printed by a black and white printer and a color printer, respectively.

6 Claims, 4 Drawing Sheets

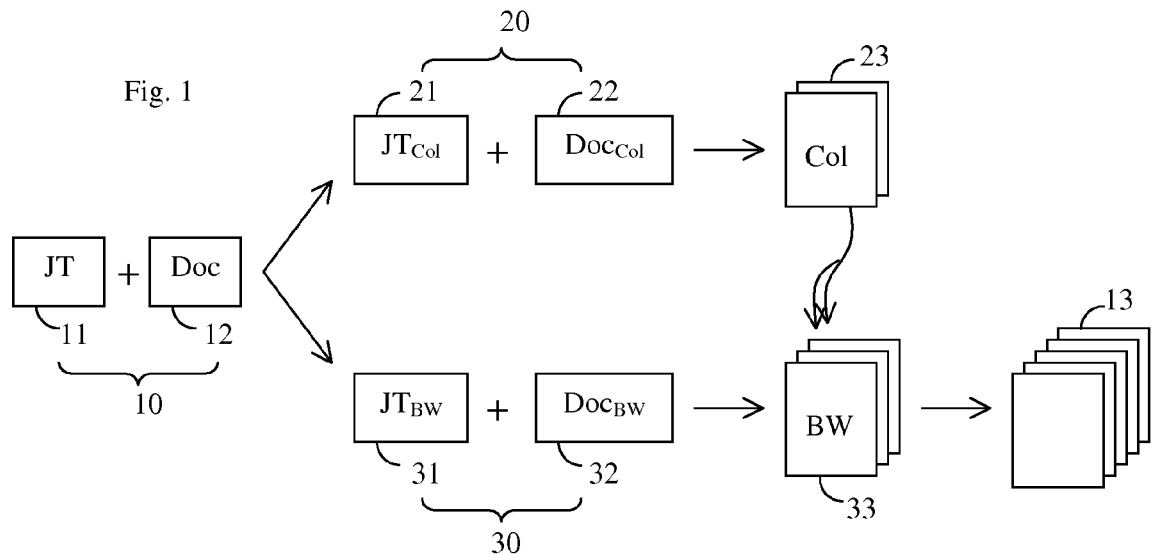

Fig. 1

| Type | JT Parameters | JT$_{BW}$ Parameters | JT$_{Col}$ Parameters |
|---|---|---|---|
| 1 | number of copies<br>orientation of print<br>output paper size<br>font<br>⋮ | keep | keep |
| 2 | input tray<br>output tray<br>⋮ | keep | override (adjust for color device) |
| 3 | staple<br>hole punch<br>fold<br>⋮ | keep | delete (to be done on black and white device) |
| 4 | per page settings | shift (exclude color pages) | shift (exclude black and white pages) |
| 5 | paper inserter unit settings | add (to insert color pages) | N/A |

Fig. 2

| | | | | | | | | | | | |
|---|---|---|---|---|---|---|---|---|---|---|---|
| total (original Doc) | 1 | 2 | 3 | 4 | 5 | 6 | 7 | 8 | 9 | 10 | ... |
| b/w pages (Doc$_{BW}$) | 1 | 2 | | 3 | 4 | 5 | | 6 | 7 | | ... |
| color pages (Doc$_{Col}$) | | | 1 | | | | 2 | | | 3 | ... |

Fig. 3

PRINT SHOP MANAGEMENT METHOD AND APPARATUS FOR PRINTING DOCUMENTS USING A PLURALITY OF DEVICES

This application is a continuation-in-part of U.S. application Ser. No. 11/395,585, filed Mar. 31, 2006, now pending, which is herein incorporated by reference in its entirety.

BACKGROUND OF THE INVENTION

1. Field of the Invention

This invention relates to a method and apparatus for managing a print shop system in which a plurality of printers and finishing devices are connected to and managed by a server. In particular, it relates to a method and apparatus for managing and performing print jobs using a plurality of printers and/or finishing devices.

2. Description of Related Art

A professional print shop typically has a plurality of printers and finishing devices connected to a server by a network, where the server controls the printing of customer jobs on one or more printers. The printers and finishing in a print shop typically have different characteristics and capabilities. For example, a print shop typically has both black and white printers and color printers. Printers may also include certain finishing capabilities. Depending on the requirements of the customer's print job specified in a print request (referred to as a job ticket) and the capabilities of the available printer and finishing devices, different parts of the job may be printed using different printers and appropriate off-line finishing devices may used to perform finishing functions. For example, U.S. Patent Application Publication No. 2002/0042798 describes "a printing system capable of reducing workload of an operator by automatically separating finishing specifics of a printed product into tasks to be performed by an on-line printer and tasks to be performed by an off-line finishing device. The printing system comprises an on-line client, print server and printer as well as an off-line finishing device, and the print server receives the job ticket from the client, separates the finishing specifics included in the received job ticket into those to be performed by the printer and those to be performed by the finishing device based on information regarding specifications and installed options of the printer and finishing device, sets in the printer parameters for the finishing specifics separated and assigned to the printer, and creates data for a finishing device job ticket that includes the finishing specifics separated and assigned to the finishing device." (Abstract.) U.S. Pat. No. 7,061,636 describes a system and method "for a production monitor controller used in a finishing system wherein the controller uses information concerning the constraints of devices within the system to break the job into job segments wherein each job segment conforms to the constraints of the devices operating on the job segment." (Abstract.)

SUMMARY OF THE INVENTION

The present invention is directed to a method and system for managing print jobs that can intelligently utilize the capabilities of the printers and finishing devices based on an analysis of the content of the documents to be printed in addition to the parameters of the job ticket.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other objects, as embodied and broadly described, the present invention provides a method for managing a print shop system, the print shop system including a plurality of printers and/or finishing devices connected to a server, the method being implemented on the server, the method including: (a) obtaining a print job including a job ticket and source document to be printed; (b) generating two or more sub-jobs each including a sub-job ticket and a sub-document by analyzing the job ticket and the content of the source document; and (c) submitting the two or more sub-jobs to a plurality of printers and/or finishing devices in accordance with the sub-job tickets.

In another aspect, the present invention provides a computer program product that causes a data processing apparatus to perform the above method.

It is to be understood that both the foregoing general description and the following detailed description are exemplary and explanatory and are intended to provide further explanation of the invention as claimed.

BRIEF DESCRIPTION OF THE DRAWINGS

FIG. 1 schematically illustrates a print job split process in a color split example.

FIG. 2 is a table illustrating the parameters in a job ticket and a method of splitting a job ticket into two sub-job tickets in a color split example.

FIG. 3 illustrates the pages of an original document being split into two sub-documents in a color split example.

DETAILED DESCRIPTION OF THE PREFERRED EMBODIMENTS

Figure 6:
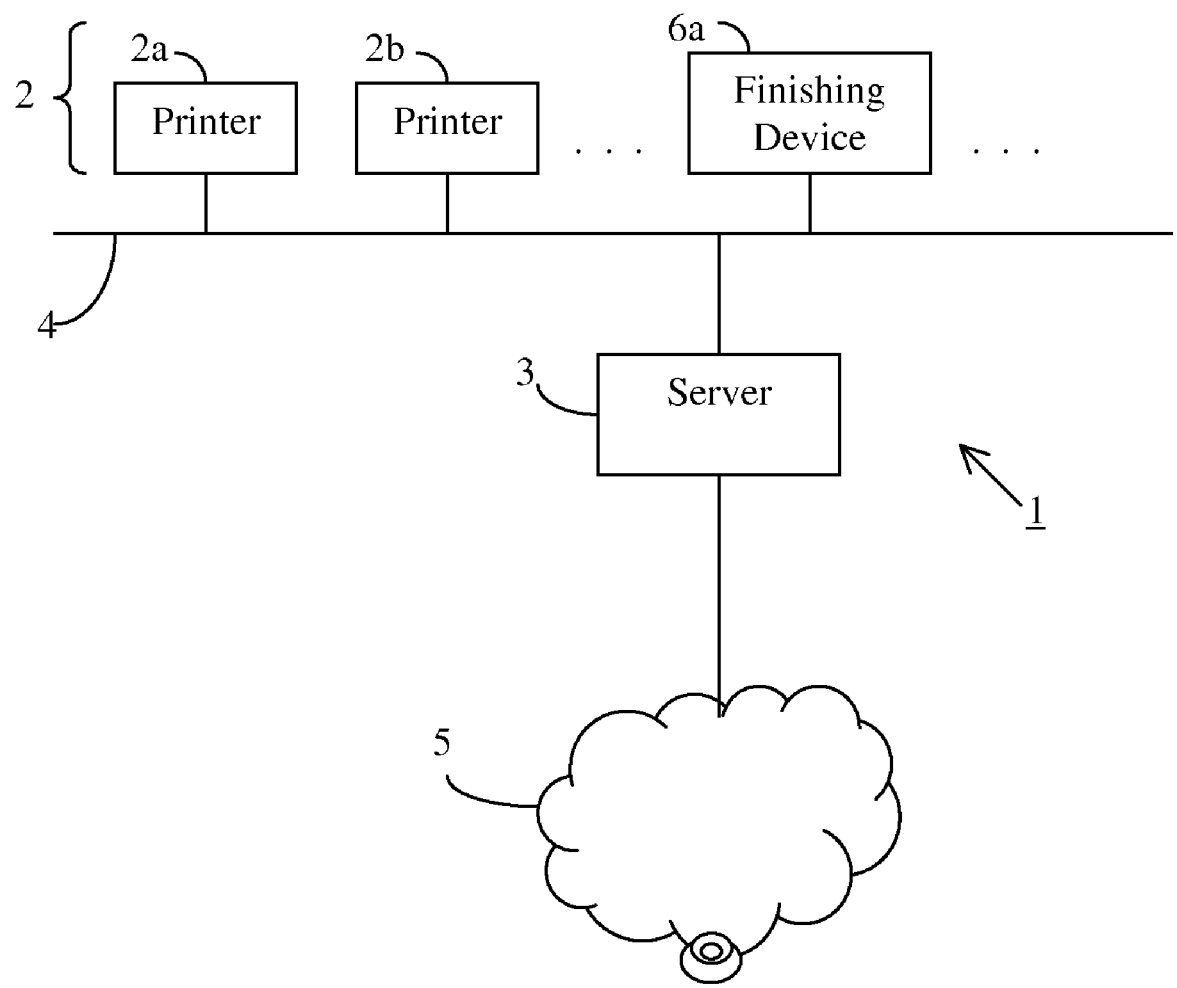
FIG. 6 schematically illustrates a print shop system having a plurality of printers connected to a server via a network in which methods according to embodiments of the present invention may be implemented.

FIG. 6 schematically shows a print shop system 1 having a plurality of printers 2a, 2b, . . . and off-line finishing devices 6a . . . connected to a server (or any suitable data processing apparatus) 3 via a network 4. One or more user terminals (not shown) are also connected to the server to enable print shop operators to interact with the server and the rest of the system. The server 3 is preferably also connected to an external network 5 such as the Internet for receiving print jobs (i.e. print requests from customers and documents to be printed). The server 3, under control of print shop management software, receives print jobs from customers and submits print commands and data to be printed to one or more printers 2. The print shop management software may make various management decisions, such as which printer(s) to use for a print job, either automatically or under various degree of control of an operator.

In conventional systems, the print shop management software determines which printer(s) and finishing device(s) to assign to the print job based on information specified in the job ticket and the capabilities of the various available printers and finishing devices. Thus, for example, if a job ticket specifies that a document (herein after referred to as the source document) is to be printed using a color printer, the server will assign the job to a color printer, even if the majority of the pages in the document are in fact black and white. This results in inefficient use of color printers and increased cost because it is typically more costly to print black and white pages on a color printer than on a black and white printer. In another example, pages in a document may contain text, graphics, and photographs. It may be desirable to print text-only pages using binary black and white printing, and print pages containing graphics and photographs using a printer with grayscale capability or setting. In another example, a document may contain different paper sizes, such as letter sized pages and 11×17 sized pages (e.g., to be z-folded). Because print shops often configure some devices for a specific paper size (such as letter size, etc.) and other devices with other paper sizes (such as legal size, 11×17, etc.), it would be more efficient to print the letter sizes pages on a printer configured with letter sized paper, and the 11×17 pages on a printer configured with 11×17 paper. Yet another example is tab printing. Since not all devices will support tab printing, tab pages may be printed on a printer that support tab printing while other pages may be printed on a regular printer.

Accordingly, embodiments of the present invention provide print shop management methods and systems that implement a print job, such as determining which printers are assigned for printing portions of the source document, by analyzing the content of the source document in addition to the information within the job ticket. An embodiment of the invention is described below using color split printing as an example.

When a document to be printed (the source document) is a mixed color document, i.e. one that contains both color pages and black and white pages, the server 3 makes a determination as to whether to submit the entire print job (i.e. all pages of the source document) to a color printer(s), or to split the print job into two sub-jobs by submitting the color pages to a color printer(s) and the black and white pages to a black and white printer(s). A commonly owned, co-pending U.S. patent application Ser. No. 11/395,583, filed Mar. 31, 2006, entitled "Print Shop Management Method and Apparatus for Printing Mixed Color and Black and White Documents", which is incorporated by reference herein in its entirety, describes exemplary methods for making such a determination. If the server decides to split the print job into two sub-jobs, the server splits the print job, and submits them to two different printers. The printed pages from the two printers are then combined into one printed document.

As schematically illustrated in FIG. 1, an original print job 10 includes a print request 11, sometimes referred to as a "job ticket", and a document to be printed 12. A job ticket, which is associated with the document to be printed, specifies various parameters that govern the printing of the document, such as the number of copies (or prints), orientation, input tray, output tray, finishing instructions (staple, hole punch, etc.), etc. To accomplish split job printing, the original print job 10 is split into two sub-jobs, a color sub-job 20 and a black and white sub-job 30 in this example. The color sub-job 20 includes a color sub-job ticket 21 associated with a color sub-document 22, and the black and white sub-job 30 includes a black and white sub-job ticket 31 associated with a black and white sub-document 32. The color sub-job 20 is printed on a color printer according to the parameters in the color sub-job ticket to generate a color output 23, and the black and white sub-job 30 is printed on a black and white printer according to the parameters in the black and white sub-job ticket to generate a black and white output 33. The color output 23 and the black and white output 33 are merged or collated together according to the original page order of the source document 12, and finished according to the finishing instructions of the original job ticket 11 to produce a final printed document 13.

Merging or collating of outputs of two printers may be accomplished by using a paper inserter unit of one of the printers. A paper inserter unit, also called a collator, is a feeder in a printer that feeds the paper in it to the output tray of the printer, without printing on them, in a programmed order concurrently with the printing of another document by the printer. First, a first sub-document is printed on a first printer, and the output is transported to a paper inserter unit of a second printer. The second sub-document is then printed on the second printer. As a result, the pages in the paper inserter unit are merged with the concurrently printed pages of the second sub-document according to a programmed merging order. The merging order is pre-programmed into the second sub-job ticket in a method described in more detail below. FIG. 1 shows the color output as being printed first and merged into the black and white pages, but the black and white pages can be printed first and merged into the color pages. Preferably, the original job is split such that the printer having the finishing capabilities required by the original job will be the second printer, so that finishing can be done at the second printer after merging, without having to move the merged outputs to another finishing device. If both printers have the requisite finishing capabilities, then the original job is preferably split such that the sub-job having fewer pages is printed first and merged with the sub-job having more pages so as to reduce the time required to insert pages during merging.

As an alternative to a paper inserter unit of the second printer, a separate device may be used to merge two sets of already printed pages according to a programmed order. Such a device has two or more input units, and can be programmed to take pages from the various input units according to the programmed order to merge them into one set of pages.

When a print job is split into a color sub-job 20 and a black and white sub-job 30, the server generates two separate sub-job tickets 21 and 31 and two separate sub-documents 22 and 32 based on the original job ticket 11 and the content of the original document 12. The Table in FIG. 2 illustrates the typical parameters in an original job ticket (the column labeled "JT Parameters") and how the various parameters are treated when a job ticket is split into two sub-job tickets (the column labeled "$JT_{BW}$ Parameters" for the black and white sub-job and the column labeled "$JT_{Col}$ Parameters" for the color sub-job). As shown in the Table, job ticket parameters fall into different types. A first type of parameters is global parameters for the print job which will apply to the black and white sub-job and color sub-job equally. These parameters include the number of copies to be made, the orientation of printing, the output paper size, the font, etc. For the first type of parameters, their values are retained for the corresponding parameters in the color sub-job ticket and the black and white sub-job ticket.

A second type of job ticket parameters includes device settings such as the input and output paper tray setting for the printer. When these parameters were originally set when the job ticket was created, they were typically intended for printing the entire job on a single printer. For this type of job ticket parameters, their values are retained for one of the two sub-jobs, and overwritten for the other sub-job. In the illustrated example, these parameters are retained for the black and white sub-job, and overwritten for the color sub-job by replacing them with proper values for the color printer. For example, the original input tray setting may specify tray 3 intended for the black and white printer; it may be adjusted to input tray 1 for the color sub-job ticket as is appropriate for the color printer.

A third type of job ticket parameters include finishing functions, such as staple, hole punch, fold, etc. The values of these parameters are retained for one of the two sub-jobs, and deleted for the other sub-job because finishing will be performed on only one printer after the color and black and white outputs are merged. In the illustrated example, these parameters are retained for the black and white sub-job, and deleted for the color sub-job. Note here that deleting the parameters has the same effect as assigning them null values, such as "no staple", "no hole punch", etc. In this sense, these parameters can be considered to be overwritten for the color sub-job ticket, similar to the treatment of the second type of parameters.

A fourth type of job ticket parameters is per page settings, i.e. settings that are associated with specific pages of the source document. These settings will follow the page content, i.e., each setting is retained in the sub-job ticket that corresponds to the sub-document that contains the page. Due to the splitting of the original document, however, the page numbers in the sub-documents will be shifted accordingly, as illustrated in FIG. 3. FIG. 3 shows how the pages of an original document (top row) become pages of two sub-documents (middle and bottom rows). As shown, pages 3, 7, 10, . . . of the original document are color pages and become pages 1, 2, 3, . . . of the color sub-document. The black and white pages 1, 2, 4, 5, 6, 8, 9, . . . of the original document are now pages 1, 2, 3, 4, 5, 6, 7, . . . of the black and white sub-document. (Note here that the term "page numbers" does not refer to the printed page numbers on the printed outputs. The printed page numbers should retain their original numbering scheme as in the original document, whatever that may be.) Thus, for example, the per page setting (if any) for page 1 of the original document is copied to the per page setting for page 1 of the black and white sub-document; the per page setting for page 3 of the original document is copied to the per page setting for page 1 of the color sub-document; the per page setting for page 9 of the original document is copied to the per page setting for page 7 of the black and white sub-document; etc. In other words, the per page setting of the original document are retained for the black and white sub-job ticket after shifting the page numbers by excluding color pages in the original document, and the per page setting of the original document are retained for the color sub-job ticket after shifting the page numbers by excluding black and white pages in the original document. This step requires analyzing the content of the original document, and may be performed in conjunction with the step of splitting the original document into two sub-documents, described later.

A fifth type of job ticket parameters relate to merging the resulting two sub-jobs together. In the illustrated example, merging will be done by using the paper inserter unit of one of the printers (here the black and white printer), and the fifth type of parameters includes the paper inserter unit settings. Thus, the paper inserter settings are added for the black and white sub-job ticket to insert color pages. The paper inserter unit settings describe the order in which the papers in the paper inserter unit (i.e. the output of the color sub-job) are to be inserted when printing the black and white sub-job. The same information used in setting the fourth type of parameters, i.e., how the page numbers of the black and white sub-document and color sub-document are related to the page numbers of the original document, as illustrated in FIG. 3, is also used here to set the paper inserter unit settings. Thus, in the example of FIG. 3, the paper inserter unit setting will be such that the first page in the paper inserter unit will be inserted after printing the first two pages of the black and white sub-document, the second page in the paper inserter unit will be inserted after printing three more pages of the black and white sub-document, etc.

Using the above-described method, the values of the various types of job ticket parameters are assigned for the black and white and color sub-jobs and the two sub-job tickets are generated.

The Table in FIG. 2 merely illustrates an example of a job ticket and how it is split; many variations will be encountered in actual practice. For example, the second type of parameters may be kept for the color sub-job ticket and overridden for the black and white sub-job ticket; the third type of parameters may be kept for the color sub-job ticket and deleted for the black and white sub-job ticket (i.e. finishing is to be done at the color printer); and the fifth type of parameters may be added to the color sub-job ticket only (i.e. to use the paper inserter unit of the color printer to merge the document). Each type of parameters may include additional parameters, or additional types of parameters may be added as appropriate, and there treatment in a job split should be based on similar considerations as described here.

Referring back to FIG. 1, in addition to generating the two sub-job tickets 21 and 31 as described above, the content of the original document 12 is analyzed to generate the color and black and white sub-documents 22 and 32. The color sub-document 22 contains all of the color pages of the original document 12, and the black and white sub-document 32 contains all of the black and white pages of the original document, in appropriate page orders such as that illustrated in FIG. 3. Typically, a document contains metadata that indicates the nature of its contents, including whether a particular page or object contains color or black and white data. This metadata can be used to detect which pages in the document are color and which pages are black and white, and to copy the appropriate page contents to the color or the black and white sub-document to generate the two sub-documents. Meanwhile, the information about which page of the original document is color or black and white is collected, and used to set the fourth and fifth types of parameters for the color and black and white sub-job tickets as described earlier.

Alternatively, if the pages in the document are to be rearranged when printed, e.g., when double-sided printing (two pages printed on two sides of each sheet of paper, also referred to as duplex) or two-on-one or multiple-on-one printing (two or more pages are printed on the same side of one sheet of paper, also referred to as N-up) is desired, then the server will analyzed the document and rearrange the pages, and determine which printed sheet (after rearrangement) is color or black and white. The color and black and white sub-documents will be generated using the rearranged pages.

Figure 4:
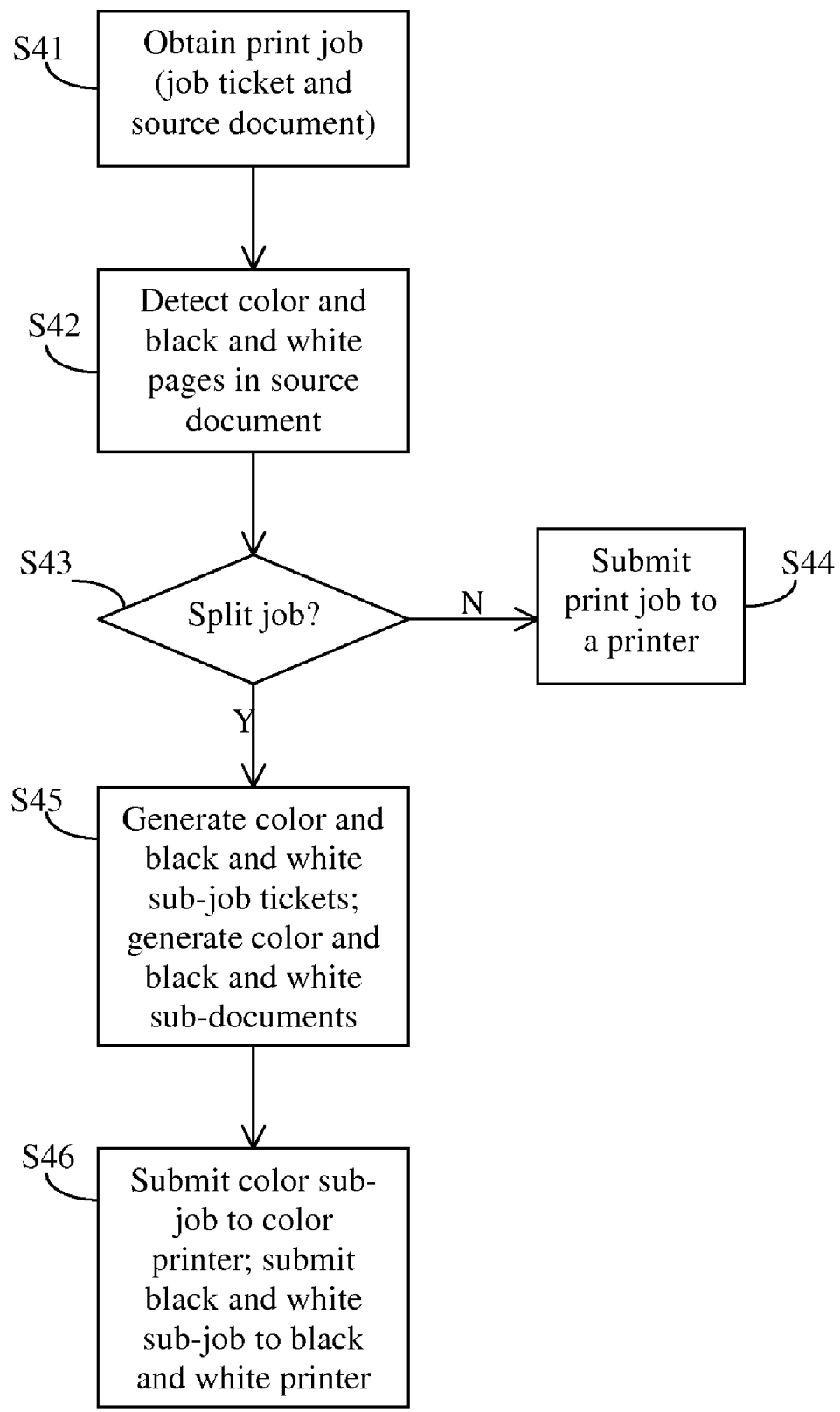
FIG. 4 is a flow chart illustrating a method for managing print jobs according to an embodiment of the present invention.

FIG. 4 illustrates a method implemented in a server for managing the printing of a mixed color and black and white document according to an embodiment of the present invention. The method can be implemented in the server by software, firmware or hardware. The software may be a part of a print shop management software program.

When a job ticket and the associated source document are received from a customer or otherwise obtained by the server (step S41), the server analyzes the source document to detect the color and black and white pages within the document (step S42). The pages may be rearranged if necessary (e.g. if duplex or N-up is required) before analyzing the page content. The server makes a determination (step S43) as to whether or not the print job is to be split into a color sub-job and a black and white sub-job. Methods of making such a determination are described in more detail in the above-referenced co-pending U.S. patent application entitled "Print Shop Management Method and Apparatus for Printing Mixed Color and Black and White Documents". If the server decides not to split the job ("N" in step S43), the server will submit the print job to a printer according to conventional printing methods (step S44). If the print job is to be split ("Y" in step S43), the server generates color and black and white sub-job tickets and color and black and white sub-documents (step S45) based on the original job ticket and the source document using the methods described earlier. The server then submits the color sub-job to a color printer and black and white sub-job to a black and white printer (step S46).

The remaining steps of the printing operation, such as transporting the output from one printer to the paper inserter unit of the other printer, may be carried out by an operator.

If merging is to be carried out using a paper inserter unit of one of the printers, the sub-job for that printer should start after the other sub-job has finished printing and an operator has transported its output to the paper inserter unit of the merging printer. In such a case, the server may submit the sub-job for the merging printer after receiving a further command from the operator indicating that this sub-job is ready to start. Alternatively, the server may submit the sub-job to the merging printer with a "hold" status, so that the merging printer will only start its printing after it receives a command to proceed from the operator (which may be entered by using a user interface device on that printer). Alternatively, all sub-jobs may be submitted to the respective printers with a "hold" status to allow the operator to start the actual printing on each printer when desired (by using the user interface device on the printers). As another alternative, the two sub-jobs (each including a sub-job ticket and a sub-document) may be saved on the server and submitted to the printers at a later time.

The above-described methods are useful for splitting an original job into two sub-jobs based on color characteristics of the source document and color capabilities of the printers in the print shop. Splitting a mixed color document to print black and white pages on a black and white printer and color pages on a color printer likely will reduce the overall cost of printing the document. The same method can be used to split an original print job into two or more sub-jobs based on other criteria or properties of the document. One such example, as mentioned earlier, is a document with two different paper sizes. Using a method according to embodiments of the present invention, the print job may be printed on two printers configured with different paper sizes. Similarly, in a tab printing example mentioned earlier, a method according to embodiments of the present invention may be used to print the tab pages on one printer and the other pages on another printer.

Figure 5:
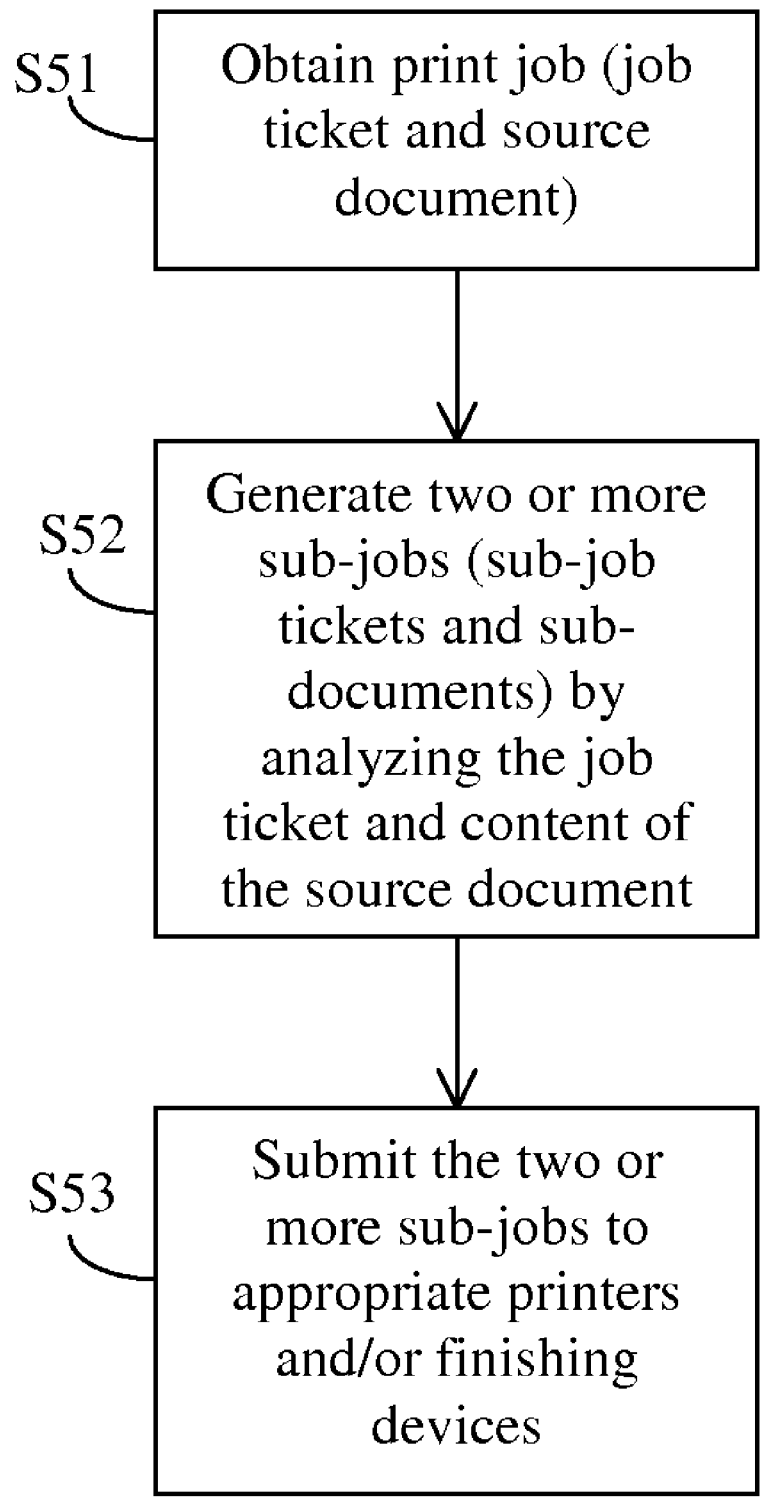
FIG. 5 is a flow chart illustrating a method for managing print jobs according to an embodiment of the present invention.

More generally, as illustrated in FIG. 5, a print shop management method according to embodiments of the present invention includes a step of obtaining a print job which includes a job ticket and source document to be printed (step S51), generating two or more sub-jobs each including a sub-job ticket and a sub-document by analyzing the job ticket and the content of the source document (step S52), and submitting the two or more sub-jobs to a plurality of printers and/or finishing devices in accordance with the sub-job tickets (step S53).

While the embodiments have been described as being applied in a print shop environment, the invention is not limited to any physical setting of a shop, and can be applied to a print shop system having a distributed setting where printers at different locations are connected to a server.

It will be apparent to those skilled in the art that various modification and variations can be made in the print shop management method and apparatus of the present invention without departing from the spirit or scope of the invention. Thus, it is intended that the present invention cover modifications and variations that come within the scope of the appended claims and their equivalents.

What is claimed is:

1. A method for managing a print shop system, the print shop system including a plurality of printers and/or finishing devices connected to a server, the method being implemented on the server, the method comprising:
    (a) obtaining a print job including a job ticket and source document to be printed, the job ticket containing job ticket parameters;
    (b) generating two or more sub-jobs each including a sub-job ticket and a sub-document by analyzing the job ticket and the content of the source document, each sub-job ticket containing sub-job ticket parameters, at least one sub-job ticket containing at least one parameter having a value different from its value in the job ticket,
    wherein the sub-job tickets for the sub-job containing the most pages includes parameters describing a merging order, the merging order defining an order in which pages of the other sub-jobs are to be merged with pages of the sub-job that contains the most pages; and
    (c) submitting the two or more sub-jobs to a plurality of printers and/or finishing devices in accordance with the sub-job tickets.

2. The method of claim 1, wherein the plurality of printers have different printing capabilities, and wherein in step (b) the at least two sub-jobs are generated by analyzing characteristics of each page of the source document corresponding to the printing capabilities of the printers.

3. The method of claim 1, wherein the plurality of printers have different color printing capabilities, wherein the source document specifies the color characteristics of each page thereof, and wherein step (b) includes examining the color characteristics of each page of the source document to generate a color sub-job and a black and white sub-job.

4. A computer program product comprising a computer usable non-transitory medium having a computer readable code embodied therein for controlling a data processing apparatus, the computer readable program code configured to cause the data processing apparatus to execute a process for managing a print shop system, the print shop system including a plurality of printers and/or finishing devices, the process comprising the steps of:
    (a) obtaining a print job including a job ticket and source document to be printed, the job ticket containing job ticket parameters;
    (b) generating two or more sub-jobs each including a sub-job ticket and a sub-document by analyzing the job ticket and the content of the source document, each sub-job ticket containing sub-job ticket parameters, at least one sub-job ticket containing at least one parameter having a value different from its value in the job ticket,
    wherein the sub-job tickets for the sub-job containing the most pages includes parameters describing a merging order, the merging order defining an order in which pages of the other sub-jobs are to be merged with pages of the sub-job that contains the most pages; and
    (c) submitting the two or more sub-jobs to a plurality of printers and/or finishing devices in accordance with the sub-job tickets.

5. The computer program product of claim 4, wherein the plurality of printers have different printing capabilities, and wherein in step (b) the at least two sub-jobs are generated by analyzing characteristics of each page of the source document corresponding to the printing capabilities of the printers.

6. The computer program product of claim 4, wherein the plurality of printers have different color printing capabilities, wherein the source document specifies the color characteristics of each page thereof, and wherein step (b) includes examining the color characteristics of each page of the source document to generate a color sub-job and a black and white sub-job.

* * * * *